United States Patent
Okano et al.

(10) Patent No.: US 9,071,782 B2
(45) Date of Patent: *Jun. 30, 2015

(54) PHYSICAL INFORMATION ACQUISITION APPARATUS FOR DRIVING PHYSICAL INFORMATION ACQUISITION SENSOR CONTROL LINES AT MULTIPLE DIVIDING POINTS

(71) Applicant: Sony Corporation, Tokyo (JP)

(72) Inventors: Masafumi Okano, Kanagawa (JP); Hiroki Ui, Tokyo (JP)

(73) Assignee: SONY CORPORATION (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/649,475

(22) Filed: Oct. 11, 2012

(65) Prior Publication Data
US 2014/0028882 A1 Jan. 30, 2014

Related U.S. Application Data

(60) Division of application No. 12/357,590, filed on Jan. 22, 2009, now Pat. No. 8,310,574, which is a continuation of application No. 11/170,246, filed on Jun. 29, 2005, now abandoned.

(30) Foreign Application Priority Data

Jul. 1, 2004 (JP) .................. 2004-195502
Jun. 16, 2005 (JP) .................. 2005-175959

(51) Int. Cl.
*H04N 1/04* (2006.01)
*H04N 5/369* (2011.01)
*H04N 5/365* (2011.01)
*H04N 5/376* (2011.01)

(52) U.S. Cl.
CPC ............. *H04N 5/369* (2013.01); *H04N 5/3653* (2013.01); *H04N 5/3765* (2013.01)

(58) Field of Classification Search
CPC ....... H04N 5/376; H04N 5/374; H04N 5/365; H04N 5/3658; H04N 1/3878
USPC ........................................ 348/294
See application file for complete search history.

(56) References Cited

U.S. PATENT DOCUMENTS

| | | | |
|---|---|---|---|
| 5,119,202 A | 6/1992 | Hashimoto et al. | |
| 5,134,488 A * | 7/1992 | Sauer | ............. 348/294 |
| 5,818,526 A | 10/1998 | Nomoto | |
| 6,246,385 B1 | 6/2001 | Kinoshita et al. | |
| 6,337,713 B1 | 1/2002 | Sato | |
| 6,437,767 B1 | 8/2002 | Cairns et al. | |
| 7,382,346 B2 * | 6/2008 | Moon | ............. 345/100 |
| 2001/0033336 A1 * | 10/2001 | Kameshima et al. | ......... 348/300 |

FOREIGN PATENT DOCUMENTS

| | | |
|---|---|---|
| JP | S62-219573 | 9/1987 |
| JP | H07-326720 | 12/1995 |
| JP | 2002-158932 | 5/2002 |

* cited by examiner

*Primary Examiner* — Gary C Vieaux
(74) *Attorney, Agent, or Firm* — Sheridan Ross P.C.

(57) ABSTRACT

A solid-state image sensor with one or more control lines driven at arbitrary dividing points along the control line.

12 Claims, 12 Drawing Sheets

$\tau b = R/2 \times C/2 = RC/4$

CLOCK TREE STRUCTURE

US 9,071,782 B2

PHYSICAL INFORMATION ACQUISITION APPARATUS FOR DRIVING PHYSICAL INFORMATION ACQUISITION SENSOR CONTROL LINES AT MULTIPLE DIVIDING POINTS

RELATED APPLICATION DATA

This application is a division of U.S. patent application Ser. No. 12/357,590, filed Jan. 22, 2009, which is a continuation of U.S. patent application Ser. No. 11/170,246, filed Jun. 29, 2005, the entirety of which is incorporated herein by reference to the extent permitted by law. The present application also claims priority to Japanese Patent Application Nos. 2004-195502, filed in the Japanese Patent Office on Jul. 1, 2004, and 2005-175959, filed in the Japanese Patent Office on Jun. 16, 2005, the entireties of both of which are incorporated by reference herein to the extent permitted by law.

BACKGROUND OF THE INVENTION

The present invention relates to a physical information acquisition method, a physical information acquisition apparatus, and a semiconductor device. More particularly, the present invention relates to a driving control technique in reading unit-element signals from unit elements, particularly suitable for use in a semiconductor device, such as a solid-state image sensor including an array of unit elements sensitive to an electromagnetic wave such as light or radiation incident from the outside and capable of outputting an electrical signal indicating a physical quantity distribution detected by the unit elements.

In various applications, to detect a physical quantity distribution, a semiconductor device is widely used which includes a linear array or a matrix array of unit elements (pixels) sensitive to a change in a physical quantity such as a pressure or an electromagnetic wave such as light or radiation incident from the outside.

For example, in video devices, a solid-state image sensor is used which includes an image sensor device of a CCD (Charge Coupled Device) type, a MOS (Metal Oxide Semiconductor) type, or a CMOS (Complementary Metal-Oxide Semiconductor) type to detect a change in a physical quantity such as light (which is an example of an electromagnetic wave).

In computer devices, a fingerprint recognition device is used to acquire fingerprint information by detecting an image of a fingerprint based on a change in an electrical or optical characteristic associated with a pressure. In these apparatus, a physical quantity distribution is converted into an electrical signal by unit elements (pixels in the case of a solid-state image sensor) and the resultant electrical signal is read out.

In some solid-state image sensors, an active pixel sensor is used in which a driving transistor for amplification is disposed in each image signal generation part that generates an image signal corresponding to a signal charge generated in a charge generation part. This structure is used in many CMOS solid-state image sensors.

In such an active solid-state image sensing apparatus, to read an image signal, unit pixels arranged in a pixel array part are sequentially selected by controlling addressing, and signals are read from the respective unit pixels. That is, the active solid-state image sensing apparatus is a solid-state image sensor of the address control type.

For example, in an active pixel sensor of the X-Y address type in which unit pixels are arranged in the form of a matrix array, each pixel is configured to have an amplification capability using an active element having a MOS structure (MOS transistor). In this structure, a signal charge (photoelectrons) accumulated in a photodiode serving as a photoelectric conversion device is amplified by the active element and read out as image information.

In the X-Y addressing solid-state image sensing device of this type, for example, a pixel array part is formed using a large number of pixel transistors arranged in the form of a two-dimensional matrix array. Accumulation of signal charges corresponding to incident light is started on a line-by-line (row-by-row) basis or a pixel-by-pixel basis, and a current or a voltage corresponding to the signal charge accumulated in each pixel is read sequentially from the respective pixels by accessing the pixels by means of addressing. In solid-state image sensing devices of the MOS type (and of the CMOS type), the addressing is performed, for example, such that pixels are simultaneously accessed on a line-by-line basis and pixel signals are read from the accessed pixels, that is, pixel signals are read on a line-by-line basis from a pixel array part.

In some solid-state image sensing devices of this type, to adapt to the reading scheme of accessing the pixel array part on a line-by-line basis and reading pixels signals from the accessed line, analog-to-digital converters and/or other signal processing units are disposed for respective vertical columns. This configuration is called a column parallel arrangement. Of solid-state image sensing devices with a column parallel arrangement, a solid-state image sensing device in which a CDS processor or a digital converter is disposed in each vertical column such that pixel signals are sequentially read and output is called a column-type solid-state image sensing device.

As a result of reductions in size and cost of solid-state image sensing devices such as CCD or CMOS image sensors, various kinds of video devices using a solid-state image sensing device, such as a digital still camera for taking a still image, a portable telephone with a camera, and a video camera for taking a motion image, have come to be widely used. CMOS image sensors can operate with less consumption power and can be produced at a lower cost than CCD image sensors, and thus CMOS image sensors are expected to be widely used instead of CCD image sensors.

In recent years, a great advance in semiconductor technology has been made, and, as a result, an increase in the number of pixels of solid-state image sensing devices has been achieved. For example, solid-state image sensing devices having several hundred pixels are now available and used in high-resolution digital still cameras and movie video cameras.

The increase in resolution results in an increase in the number of pixel transistors. The increase in the number of pixel transistors and an increase in the number of functions achieved by the capability of accessing arbitrary pixels result in an increase in the length of control lines for controlling reading of pixel signals. This causes an increase in load imposed on drivers connected to the control lines and also causes an increase in skew, which cannot be neglected.

For example, in CMOS image sensors, electrons generated as a result of photoelectric conversion are accumulated in each pixel, and pixel signals are sequentially read from pixels in pixel columns (vertical columns) specified by address control signals output from a sensor control unit (SCU).

More specifically, an address decoder is disposed in a vertical scanning circuit located close to the pixel array part, and an address control signal is supplied from the address decoder to sequentially select pixels. In accordance with the address control signal, the vertical scanning circuit supplies various kinds of control signals (generically it can be referred to as control signals) to a predetermined points on drive control lines (particularly they can be referred to as original driving points) via driving buffers. And then, the control signals go to pixel transistors, which are connected to respective driving points on the drive control lines, through the drive control lines, thereby turning on/off the pixel transistor at the specified horizontal address position. Thus, the address decoder generates data indicating the address of a pixel to be selected.

Various control signals, by which to specify the horizontal address position, control turning on/off of the pixel transistor, are transmitted via control signal lines, and pixel signals output from pixels in units of lines are sequentially transmitted in a horizontal direction via a horizontal signal line (horizontal transfer line). When there are a large number of pixels, these control signal lines and horizontal signal line extend a long distance across the whole pixel array part, and thus an interval between the original driving point and the respective driving points where each pixel is connected get longer. Accordingly skew caused by the difference in locations of pixels along these control signal lines or the horizontal signal line becomes very serious.

The skew can cause a reduction in a timing margin in an operation of shading in a horizontal direction or in an operation of transferring data to an amplifier at a following stage. Therefore, it is desirable to minimize the skew to as low a level as possible.

For example, a tree layout such as that shown in FIG. 10 is used to equally distribute a drive control signal (clock signal) in a sensor. In this layout, the overall skew of the circuit is dominated by a skew that occurs at a first stage having a longest interconnection. Thus, it is desirable to minimize the skew at the first stage.

A widely used technique of driving the same line using one or two driving buffers (pixel drivers) is to dispose one or two driving buffers at one or both ends of the line and drive the pixels using the driving buffers.

When pixels are driven from one side with one driving buffer (an example of driver unit) being connected to one end of the drive control lines, the distance between the driving buffer to the pixel varies greatly depending on the location on the line. Thus, a difference in arrival time of a driving pulse (skew) occurs among pixels depending on the locations of the pixels. That is, a difference in arrival time of the driving pulse occurs between pixels located close to the driving buffer and pixels located far from the driving buffer. This can make it impossible to read pixel signals or can cause shading.

When pixels are driven from both sides with two driving buffers (an example of driver unit) being connected to both ends of the drive control lines, the dependence of the distance from the driving buffer to the pixel on the location on the line becomes smaller than in the case in which pixels are driven from one side. However, even when pixels are driven from both sides, the dependence of the distance can be still large. That is, when pixels are driven from both sides, it becomes more difficult to read a signal from a pixel located at the center of the line as the number of pixels increases and/or as the signal reading rate increases. This is a serious problem to be solved when the signal reading rate is increased.

SUMMARY OF THE INVENTION

The present invention provides a first physical information acquisition method of reading unit-element signals from a semiconductor device, the semiconductor device including unit elements arranged in a particular order, each unit element having a unit-element signal generation part for outputting a unit-element signal indicating a detected change in a physical quantity, wherein a control line for driving unit elements to read unit-element signals from the respective unit elements is driven at a dividing point on the control line, and more preferably at a plurality of dividing points on the control line.

The present invention provides a second a physical information acquisition method, in which a control line is driven at an original driving point that results in a reduction in a maximum value of a product of load capacitance at an arbitrary driving point on the control line and line resistance between the arbitrary driving point and a driver unit that is connected to the original driving point. By determining the position at which to drive the control line, based on the time constant, it is possible to select an optimum point at which to drive the control line even in a case in which line resistance and load capacitance are distributed non-uniformly.

The present invention also provides a physical information acquisition apparatus including a drive control unit that drives a control line at an optimum point determined in the above-described manner.

The present invention also provides a semiconductor device including a drive control unit that drives a control line at an optimum point determined in the above-described manner.

DESCRIPTION OF THE PREFERRED EMBODIMENT

The present invention is described in further detail below with reference to embodiments in conjunction with the accompanying drawings. In embodiments described below, by way of example, a CMOS image sensor device whose pixels are all formed of NMOS or PMOS devices is used to construct a solid-state image sensor of the X-Y address type.

Note that the image sensor device is not limited to the MOS-type image sensor device, but the present embodiment and any other embodiment described later may be applied to any semiconductor device including a one-dimensional or two-dimensional array of elements sensitive to an electromagnetic wave incident from the outside, such as light or radiation.

<<Structure of Solid-State Image Sensor>>

Figure 1:
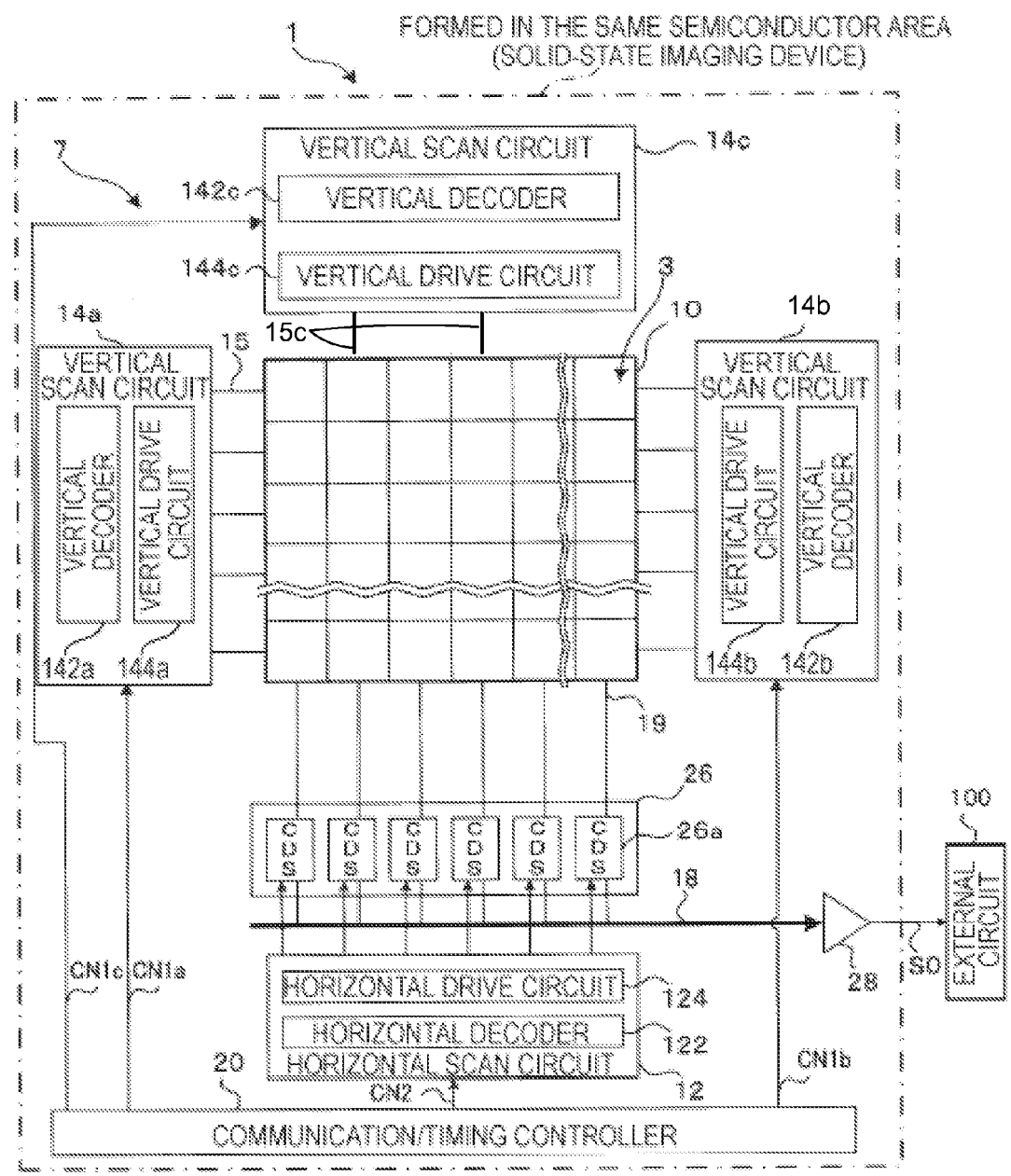
FIG. 1 is block diagram showing a CMOS solid-state image sensor (CMOS image sensor), which is an example of a semiconductor device according to an embodiment of the present invention.

FIG. 1 shows a CMOS solid-state image sensor (CMOS image sensor), which is an example of a semiconductor device according to an embodiment of the present invention. This CMOS solid-state image sensor is also an example of an electronic device according to an embodiment of the present invention.

Note that FIG. 1 shows an example of a circuit configuration, but the purpose of FIG. 1 is not to define the location of each functional unit, and the manner in which driving buffers (pixel drivers) are located according to the present embodiment will be described in detail later.

The solid-state image sensor 1 has a pixel array part in which a plurality of pixels each including a photoelectric conversion device such as a photodiode (which is an example of a charge generation part) for outputting an electronic signal corresponding to the intensity of incident light are arranged along rows and columns (in the form of a two-dimensional array). Voltage signals are output from respective pixels and supplied to data processing units such as CDS (Correlated Double Sampling) units and analog-to-digital converters (ADCs) disposed in a column-parallel fashion.

Herein, "disposing in a column-parallel fashion" implies that a plurality of CDS units and ADCs are disposed in substantially parallel at locations corresponding to the respective vertical columns along which vertical signal lines 19 extend. The CDS units and ADCs may be disposed only in an area adjacent to one side, which is perpendicular to the columns (which is the lower side as viewed in FIG. 1), of the pixel array part 10 or they may be disposed in areas adjacent to both sides of the pixel array part 10 such that some of the CDS units and ADSc are disposed in one of the two areas (in the lower area in FIG. 1) and the remaining CDS units and ADSs are disposed in the other area (the upper area in FIG. 1). In the latter case, it is desirable to divide the horizontal scanning unit, which performs scanning (horizontal scanning) in the row direction, into two parts and dispose them in the two respective areas adjacent to lower and upper sides of the pixel array part 10 such that they can operate independently.

The column type is a typical example in which CDS units and ADSs are disposed in an area of an image sensing part, called a column area, in a column-parallel fashion at locations corresponding to respective vertical columns such that signals are sequentially read via these CDS units and ADSs to the outside. The manner of disposing CDS units and ADSs is not limited to that used in the column type described above, but CDS units and ADSs may be disposed such that one CDS unit and one ADS are assigned to a predetermined number of (for example, two) adjacent vertical signal lines 19 (vertical columns), or such that one CDS unit and one ADS are assigned to every N (positive integer) vertical signal lines 19 (vertical columns).

In the above-described configurations except for the column type, a plurality of vertical signal lines 19 (vertical columns) share one CDS unit and one ADS. To this end, a selection switch is disposed such that pixels signals supplied from the plurality of signal lines 19 (vertical columns) of the pixel array part 10 are sequentially selected by the selection switch and the selected pixel signal is supplied to the one CDS unit and one ADS. Depending on a process performed in following stages, a memory for storing the output pixel signals is necessary.

In any case, using of one CDS unit and one ADS for a plurality of vertical signal lines 19 (vertical columns) and performing of signal processing on the respective pixel signals after the pixel signals are read in units of pixel columns make it possible to construct each unit pixel in a simpler form than in the case in which similar signal processing is performed in each unit pixel, and thus it is possible to increase the number of pixels of an image sensor, reduce the device size, and reduce the cost.

Because the plurality of signal processors disposed in the column-parallel fashion can concurrently process pixel signals of one row, the signal processors are allowed to operate at a lower speed than an operating speed that is needed if the pixel signals are serially processed by only one CDS unit and one ADS disposed in an output circuit or disposed outside the device. This is advantageous in that the signal processors can operate with lower consumption power and a narrower bandwidth, and the signal processors generate less noise. Conversely, when the same power consumption and the same bandwidth are allowed, it is possible to increase the overall operating speed of the sensor.

In the case of the column type, in addition to the advantages in terms of low power consumption, narrow bandwidth, and low noise obtained by the low-speed operation, there is another advantage that no column selection switch is needed. In the embodiments described below, the image sensor is assumed to be of the column type unless otherwise stated.

As shown in FIG. 1, the solid-state image sensor 1 according to the present embodiment includes a pixel array part (image sensing part) 10, a drive control unit 7, a column processor 26 including a CDS unit 26a disposed in an area adjacent to a lower side (as viewed in FIG. 1) of the pixel array part 10 and column switches (not shown), and an output circuit 28.

The column processor 26 functions as a main part of a normal image processing system for performing signal processing associated with generation of a normal image based on an image signal acquired by the pixel array part 10.

As required, an AGC (Auto Gain Control) circuit having a signal amplification capability and/or an AD (Analog to Digital) converter may be disposed in the same semiconductor area as the column processor 26, at a stage before or after the CDS unit 26a. In the case in which the AGC circuit is disposed at the stage before the CDS unit 26a, the AGC circuit is of an analog type. On the other hand, when the AGC circuit is disposed at the stage after the CDS unit 26a, the AGC circuit is of a digital type. If n-bit digital data is simply amplified, there is a possibility that degradation occurs in halftone quality. To avoid the above problem, it is desirable that an analog signal be amplified first, and then the resultant signal be converted into digital form.

The drive control unit 7 has a control circuit for sequentially reading an image signal from the pixel array part 10. More specifically, for example, the drive control unit 7 includes a horizontal scanning circuit (column scanning circuit) 12 for controlling a column address and column scanning, a vertical scanning circuit (row scanning circuit) 14 for controlling a row address and row scanning, and a communication/timing controller 20 having the capability of generating an internal clock signal. The horizontal scanning circuit 12 includes a horizontal driving controller (horizontal read scan circuit) for reading image information from the column processor 26 or a processing unit 27.

The above-described elements of the drive control unit 7 are formed in a semiconductor area of single-crystal silicon or the like together with the pixel array part 10 in an integrated form using a technique similar to that used in production of semiconductor integrated circuits, so as to obtain a solid-state image sensing device (image sensing device) which is an example of a semiconductor system according to the invention.

In the present embodiment of the invention, the vertical scanning circuit 14 includes a plurality of vertical scanning circuits (a first vertical scanning circuit 14a, a second vertical scanning circuit 14b, and a third vertical scanning circuit 14c in the example shown in FIG. 1) for sequentially selecting unit pixels 3 in the pixel array part 10 and supplying an image signal read from each unit pixel 3 of the pixel array part 10 to the column processor 26, by driving the unit pixel 3 from both sides of the pixel array part 10 or from an arbitrary middle position of the pixel array part 10.

Typically, the first vertical scanning circuit 14a and the second vertical scanning circuit 14b are used to drive control lines from the left or right end of the pixel array part 10 and the third vertical scanning circuit 14c is used to drive an arbitrary dividing point on a control line.

Although only some rows and columns are shown in FIG. 1 for the purpose of simplicity, an actual solid-state image sensor includes a greater number of rows and columns, and there are several ten to several thousand unit pixels 3 in each row or column. Each unit pixel 3 includes a photodiode serving as a photosensor (a charge generation part) and a pixel amplifier including a semiconductor element (for example, a transistor) for amplification.

Each unit pixel 3 is connected to the vertical scanning circuit 14 via a row control line 15 for selecting a row and to the column processor 26 for outputting a normal image via a vertical signal line 19. Note that the term "row control line 15" generically denotes all control lines extending from the vertical scanning circuit 14 to the pixels.

The communication/timing controller 20 controls the timing of driving pulses output from the plurality of vertical scanning circuits 14 (14a, 14b, and 14c) such that the driving pulses are output at substantially the same time from the output terminals of the respective vertical scanning circuits 14 to the row control lines 15.

The vertical scanning circuits 14 (14a, 14b, and 14c) and the horizontal scanning circuit 12 each have a decoder and start reading pixel signals to be processed in response to a control signal CN1 (CN1a, CN1b, or CN1c) or CN2 supplied from the communication/timing controller 20. Therefore, various kinds of drive control pulses (such as a reset pulse RST, a transfer control pulse TX, a DRN control pulse DRN, and a vertical selection pulse SEL) for driving unit pixels 3 are transmitted via each row control line 15.

The vertical scanning circuits 14 (14a, 14b, and 14c) and the communication/timing controller 20 form a unit-element signal selection controller (vertical drive controller) that specifies positions of respective unit pixels 3 to be processed and reads pixels signals from the respective unit pixels 3 at the specified positions to the column processor 26.

The communication/timing controller 20 includes (although not shown) a functional block serving as a timing generator TG (which is an example of a read address controller) that supplies a clock signal or timing pulses needed in operations of various parts and also includes a functional block serving as a communication interface that receives a master clock CLK0 via a terminal 5a and data DATA indicating an operation mode or the like via a terminal 5b and outputs data including information associated with the solid-state image sensor 1.

For example, a horizontal address control signal is supplied to a horizontal decoder, and a vertical address control signal is supplied to a vertical decoder, and each decoder selects a row or a column in accordance with the received horizontal or vertical address control signal.

To achieve high-speed reading of image signals from the unit pixels 3 disposed in the two-dimensional matrix form, it is desirable to scan unit pixels 3 such that the unit pixels 3 are accessed in units of rows, and analog pixel signals output in the column direction from the accessed unit pixels 3 are acquired, and then the acquired analog pixel signals are output in the row direction to the external circuit. Instead of scanning unit pixels 3 in the above-described manner, an arbitrary unit pixel 3 may be directly accessed by specifying its address to read necessary information from the specified unit pixel 3.

The vertical scanning circuit 14 supplies a pulse to select a row of the pixel array part 10. More specifically, each of a first vertical scanning circuit 14a, a second vertical scanning circuit 14b, and a third vertical scanning circuit 14c has a vertical driving circuit 144 including a vertical decoder (vertical shift register) 142 that specifies the vertical position of a row from which to read pixel signals, and also including a driving buffer (pixel driver) (not shown) that buffers the signal received from the vertical decoder 142 and supplies a drive control pulse to a row control line 15 corresponding to the row specified by the vertical decoder 142 to drive unit pixels 3 on the specified row. The vertical decoder 142 also serves to select a row in an electronic shuttering operation in addition to selection of a row in a signal reading operation.

The horizontal scanning circuit 12 sequentially selects functional parts of the column processor 26 in synchronization with a low-speed clock CLK2 and supplies signals output from the respective functional parts of the column processor 26 to a horizontal signal line (horizontal output line) 18. The horizontal scanning circuit 12 includes a horizontal decoder 122 that specifies the location in the horizontal direction of a column from which to read a pixel signal (that is, specifies a CDS unit 26a in the column processor 26) and also includes a horizontal driving circuit 124 that transmits the signal output from the column processor 26 to the horizontal signal line 18 in accordance with the read address supplied from the horizontal decoder 122.

In the case in which the pixel signals are converted into digital form by the column processor 26 (and more particularly by the respective CDS units 26a), as many horizontal signal lines 18 are needed as the number of bits n (positive integer) dealt with by the column processor 26. For example, when n=10, ten horizontal signal lines 18 are needed.

In the solid-state image sensor 1 constructed in the above-described manner, image signals output from unit pixels 3 in the respective vertical columns are supplied to the CDS unit 26a of the column processor 26 via vertical signal lines 19.

In the normal image generation/output system, the image signals from the pixel array part 10 are transmitted to the column processor 26 located on a lower side, as viewed in FIG. 1, of the pixel array part 10. In this transmission of the image signals from the pixel array part 10, all pixels in one horizontal row are simultaneously selected by the vertical scanning circuit 14 and the pixel signals of the respective vertical columns are simultaneously output in parallel. That is, the pixel signals are output in a column-parallel mode.

The CDS unit 26a of the column processor 26 performs a CDS process on the image signal in a voltage form input via the vertical signal line 19. More specifically, a signal level (indicating a noise level) obtained immediately after a pixel is reset is subtracted from a pixel signal Vsig (indicating the intensity of incident light) thereby removing a noise signal component such as fixed pattern noise (FPN) or reset noise from the pixel signal.

After the CDS process is performed by the column processor 26, the resultant image signal is transmitted to the horizontal signal line 18 via a horizontal selection switch (column switch) driven by the horizontal selection signal supplied from the horizontal scanning circuit 12 and further transmitted to the output circuit 28. The above-described process performed in the normal mode is known (a further detailed description may be found, for example, in ISSCC/2000/SESSION6/CMOS IMAGE SENSORS WITH EMBEDDED PROCESSORS/6.1 (2000 IEEE International Solid-State Circuits Conference)), and thus a further detailed description thereof is omitted.

In the solid-state image sensor 1 configured in the above-described manner, the respective pixels are driven by the first vertical scanning circuit 14a, the second vertical scanning circuit 14b, and the third vertical scanning circuit 14c such that image signals output from pixels in respective vertical columns are supplied on a row-by-row basis from the pixel array part 10, in which photosensors serving as charge generation parts are arranged in the form of the matrix array, to the column processor 26 and output to the external circuit at a normal frame rate.

As a result, one frame of image composed of a set of pixel signals output from the respective photosensors (photoelectric conversion devices such as photodiodes) arranged in the form of the matrix array in the pixel array part 10 is output as an image signal S0 from the output circuit 28 to the external circuit 100.

The external circuit 100 includes an analog-to-digital (A/D) converter for converting the analog image signal S0 output from the output circuit 28 into digital image data D0, and also includes a digital signal processor (DSP) for performing digital signal processing on the digital image data output from the A/D converter. The digital signal processor performs color separation on the image data and further performs other signal processing the image data RGB thereby generating image data RGB representing R (red), G (green), and B (blue) image components to be output to a monitor. The digital signal processor has a functional block for compressing image data to be stored on a storage medium.

The external circuit 100 also includes a digital-to-analog (D/A) converter for converting digital image data output from the digital signal processor into an analog image signal. The image signal output from the D/A converter is supplied to a display device such as a liquid crystal monitor. A user can perform various operations while viewing the image displayed on the display device.

Although in the present embodiment, the solid-state image sensor 1, which is an example of a physical information acquisition apparatus (in the broad sense) according to the invention, is realized by forming, on a single circuit board or a single semiconductor substrate, the pixel array part 10 that is the main part of the image sensor that is an example of a semiconductor device, and the physical information acquisition apparatus (in the narrow sense) including the drive control unit 7 that drives the pixel array part 10 and also including the column processor 26 that performs the signal processing on the image signal output from the pixel array part 10, the solid-state image sensor 1 may be configured in various other ways. For example, the pixel array part 10 and the other parts may be formed separately. In this case, the physical information acquisition apparatus is configured using the drive control unit 7 and the column processor 26.

<<Pixel Structure>>

FIG. 2 shows an example of a structure of a unit pixel 3 and a relationship of the driver unit and pixel transistors used in the solid-state image sensor 1 shown in FIG. 1. In the example shown in FIG. 2, the structure of each unit pixel (pixel cell) 3 in the pixel array part 10 is similar to that of a common CMOS image sensor, and each unit pixel 3 is configured with four transistors. Note that the configuration of the unit pixel 3 is not limited to the 4-transistor configuration employed herein, but other configurations such as a 3-transistor configuration disclosed in Japanese Patent No. 2708455 may also be employed, as long as the configuration of the unit pixel 3 allows it to form a CMOS image sensor array.

As for the in-pixel amplifier, for example, a floating diffusion amplifier may be used. More specifically, for example, a 4-transistor configuration widely used in CMOS sensors can be realized using a read selection transistor that is an example of a charge reading part (transfer gate/read gate) connected to a charge generation part, a reset transistor that is an example of a reset gate, a vertical selection transistor, and an amplification transistor in the form of a source follower that is an example of a detection element for detecting a voltage change of the floating diffusion layer.

Figure 2A:
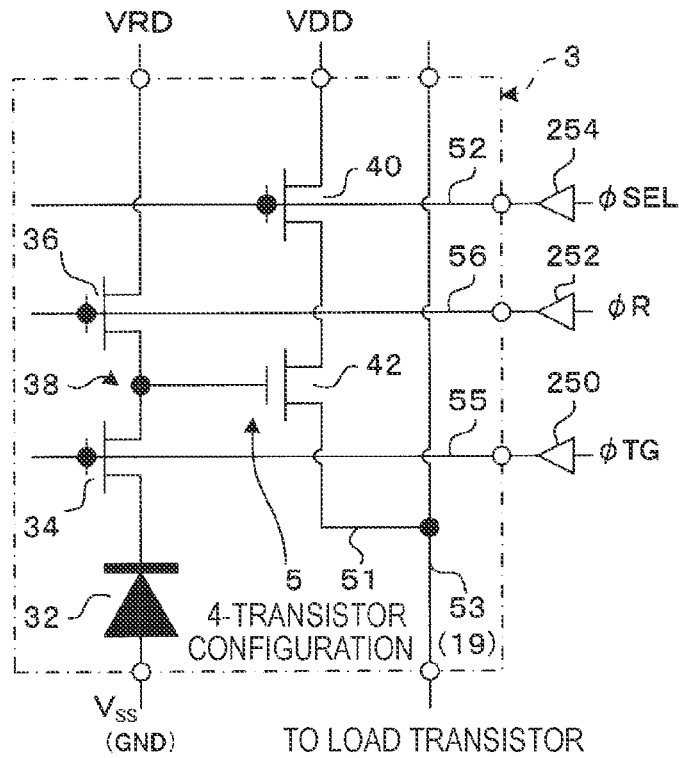
FIGS. 2*a*-2*c* are diagrams showing an example of a configuration of a unit pixel used in the solid-state image sensor shown in FIG. 1.

For example, in the 4-transistor configuration shown in FIG. 2(A), the unit pixel 3 is formed using a charge generation part 32 for converting incident light into a charge and storing the resultant charge, a read selection transistor (transfer transistor) 34 that is connected to the charge generation part 32 and that is an example of a charge reading element (transfer gate/read gate), a reset transistor 36 that is an example of a reset gate, a vertical selection transistor 40, and an amplification transistor 42 in the form of a source follower that is an example of a detection element for detecting a voltage change of a floating diffusion layer 38.

This unit pixel 3 includes an image signal generation part 5 in the form of a floating diffusion amplifier (FDA) formed of the floating diffusion layer 38 that is an example of a charge injection part having a charge accumulation function. The floating diffusion layer 38 is a diffusion layer having parasitic capacitance.

The read selection transistor (second transfer element) 34 is driven by a transfer driving buffer 250 via a transfer line (read selection line TX) 55. The reset transistor 36 is driven by a reset drive buffer 252 via a reset line (RST) 56. The vertical selection transistor 40 is driven by a selection drive buffer 254 via a vertical selection line (SEL) 52. These drive buffers are independently driven by the first vertical scanning circuit 14a or the second vertical scanning circuit 14b.

The source of the reset transistor 36 in the image signal generation part 5 is connected to the floating diffusion layer 38, and the drain thereof is connected to the power supply VDD. To the gate (reset gate RG) of the reset transistor 26, a reset pulse RST is input via a reset driving buffer. The reset transistor 36 serves to reset the voltage of the output circuit 28.

The drain of the vertical selection transistor 40 is connected to the source of the amplification transistor 42, the source thereof is connected to the pixel line 51, and the gate (vertical selection gate SELV) thereof is connected to the vertical selection line 52. The connection is not limited to this example, but the electrodes of the vertical selection transistor 40 may be connected in other ways. For example, the drain of the vertical selection transistor 40 may be connected to the power supply VDD, the source may be connected to the drain of the amplification transistor 42, and gate may be connected to the vertical selection line 52.

A vertical selection signal SEL is applied to the vertical selection line 52. The gate of the amplification transistor 42 is connected to the floating diffusion layer 38, the drain thereof is connected to the power supply VDD, and the source thereof is connected to the pixel line 51 via the drain of the vertical selection transistor 40 and further to the vertical signal line 19.

In this 4-transistor configuration, because the floating diffusion layer 38 is connected to the gate of the amplification transistor 42, the amplification transistor 42 outputs a voltage signal corresponding to the voltage of the floating diffusion layer 38 (hereinafter, referred to as an FD voltage) to the vertical signal line 53 (19) via the pixel line 51.

The reset transistor 36 resets the floating diffusion layer 38. The read selection transistor (transfer transistor) 34 transfers the signal charge generated in the charge generation part 32 to the floating diffusion layer 38. To select one of many pixels connected to the vertical signal line 19, a vertical selection transistor 40 connected to a pixel to be selected is turned on while maintaining other vertical selection transistors 40 in the off state. As a result, the selected pixel is connected to the vertical signal line 19 and a signal output from the selected pixel is output via the vertical signal line 19.

On the other hand, if the 3-transistor configuration using a charge generation part and three transistors is employed, it is possible to reduce the area occupied by the transistors in the unit pixel 3 and thus it is possible to reduce the total size of the unit pixel 3 (refer to, for example, Japanese Patent No. 2708455).

Figure 2B:
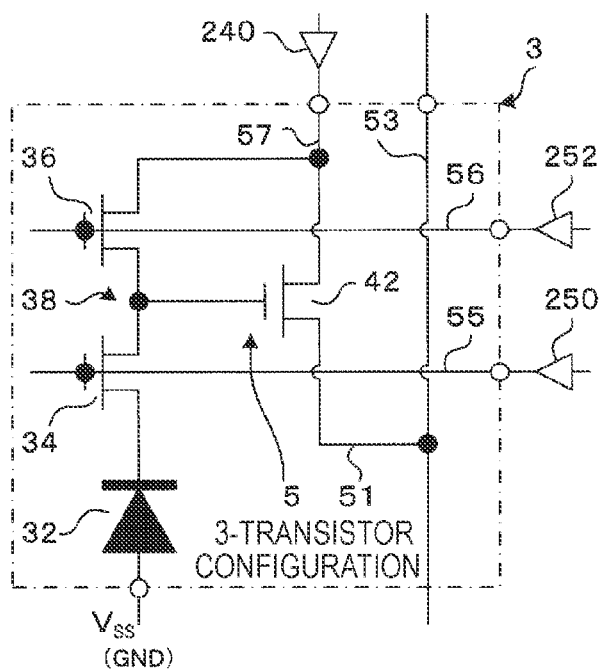

For example, as shown in FIG. 2B, a unit pixel 3 can be formed in a 3-transistor configuration using a charge generation part 32 (for example, a photodiode) for generating a signal charge corresponding to incident light by means of a photoelectric conversion, an amplification transistor 42 connected to a drain line (DRN), for amplifying the signal voltage corresponding to the signal charge generated by the charge generation part 32, and a reset transistor 36 for resetting the charge generation part 32. A read selection transistor (transfer gate) 34, which is driven by a vertical scanning circuit 14 (not shown) via a transfer line (TRF) 55, is disposed between the charge generation part 32 and the gate of the amplification transistor 42.

The gate of the amplification transistor 42 and the source of the reset transistor 36 are connected to the charge generation part 32 via the read selection transistor 34, and the drain of the reset transistor 36 and the drain of the amplification transistor 42 are connected to the drain line. The source of the amplification transistor 42 is connected to the vertical signal line 53.

The read selection transistor 34 is driven by the transfer driving buffer 250 via the transfer line 55. The reset transistor 36 is driven by the reset driving buffer 252 via the reset line 56.

The transfer driving buffer 250 and the reset driving buffer 252 operate with a voltage swing between a reference voltage of 0 V and a power supply voltage. Thus, a low-level voltage supplied to the gate of the read selection transistor 34 in the pixel is equal to 0 V.

In this unit pixel 3 with the 3-transistor configuration, as in the unit pixel 3 with the 4-transistor configuration, because the floating diffusion layer 38 is connected to the gate of the amplification transistor 42, a signal output from the amplification transistor 42 to the vertical signal line 53 has a voltage corresponding to the voltage of the floating diffusion layer 38.

The reset line (RST) 56 connected to the reset transistor 36 extends in the row direction. The drain line (DRN) 57 is connected in common to almost all pixels. The drain line 57 is driven by a drain driving buffer (hereinafter, referred to as a DRN driving buffer) 240. The reset transistor 36 is driven by the reset driving buffer 252 to control the voltage of the floating diffusion layer 38.

Although in FIG. 2(B), the drain line 57 is divided in the row direction, drain lines 57 in a row are actually connected in common to each other such that all pixels in the row are simultaneously driven. The signal charge generated by the charge generation part 32 (photoelectric conversion device) is transferred to the floating diffusion layer 38 via the read selection transistor 34.

In the 3-transistor configuration, unlike the 4-transistor configuration, the unit pixel 3 does not have the vertical selection transistor 40 connected in serial to the amplification transistor 42. The selection of one of many pixels connected to the vertical signal line 53 is performed not by turning on the selection transistor but by controlling the FD voltage. The FD voltage is normally at a low level. If the FD voltage of the pixel to be selected is raised to a high level, the signal output from the selected pixel is supplied to the vertical signal line 53. Thereafter, the FD voltage of the selected pixel is returned to the low level. This process is simultaneously performed for all pixels in one row.

More specifically, the FD voltage is controlled as follows. 1) To raise the FD voltage of a row to be selected to the high level, the drain line 57 is raised to the high level to raise the FD voltage to the high level via the reset transistors 36 in the row to be selected, and 2) the FD voltage of the selected row is returned to the low level by lowering the drain line 57 to the low level thereby lowering the FD voltage to the low level via the reset transistors 36 in the row to be selected.

In the above-described operation, the load that is imposed on the drain driving buffer 240 when the drain driving buffer 240 drives the drain line 57 becomes greater than the load that is imposed on the transfer driving buffer 250 when the transfer driving buffer 250 drives the transfer gate line 55 that is another driving line and greater than the load that is imposed on the reset driving buffer 252 when the reset driving buffer 252 drives the reset gate line 56, and thus the skew depending on the location on the line acting as the load becomes greater than the skew on the transfer gate line 55 or the reset gate line 56.

Each transistors 34, 36 and 40, which are included in unit pixel 3, are driven by the driving buffer through the drive control lines 52, 55, 56 and 57.

Figure 2C:
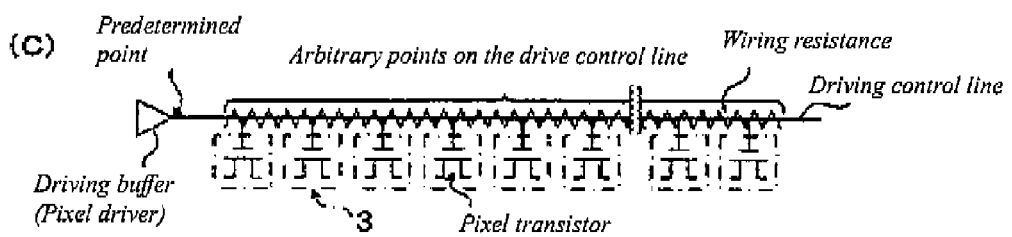

Drive control pulses are transmitted to the drive control line with the driver unit being connected to the predetermined points of the drive control line, as described in FIG. 2(c). And then, the drive control pulses reach the pixel transistors, which are connected to arbitrary points on the drive control line, through the drive control line. The drive control line as a whole is an object of driving by the driver unit and so all the points on the drive control line can be the driving points.

<<Concept of Improving Method>>

In the present embodiment, when a pixel signal is read by driving each unit pixel 3 of the pixel array part 10, a control line is driven at a particular point (or at a plurality of points) in a particular range of the control line include in the substantially effective area of the pixel area 10, in which to suppress the skew by a driving buffer (driver unit) so that the load imposed by pixels on the driving buffer is reduced and becomes uniform (the dependence of the location on the load is reduced).

To achieve the above purpose, the control line is driven by a driving buffer (pixel driver) at an arbitrary dividing point (and more preferably, at a plurality of dividing points). As required, the control line is also driven at one or both ends of the control line.

To drive the control line at a dividing point, a driving buffer is connected, at the arbitrary dividing point, to the control line extending in the pixel array part 10 and a drive control pulse is supplied from the driving buffer over the control line at the same timing as that of a drive control pulse supplied from one or both end points of control line. The dividing point on the drive control line, which is connected to the driver unit is the original driving point.

The control line the skew along which is to be suppressed and the driving buffers are disposed so as to make the greatest value of products of the load capacitance and the line resistance between the dividing point (original driving point) and an arbitrary driving point on the drive control line within the effective range in which the skew is to be suppressed, smaller than on the driving method of the related art (one-end driving or both-ends driving) and preferably to make a maximum value of a products local minimum or substantially local minimum. The details of the technique are described below with reference to specific examples.

First Embodiment

Figure 3:
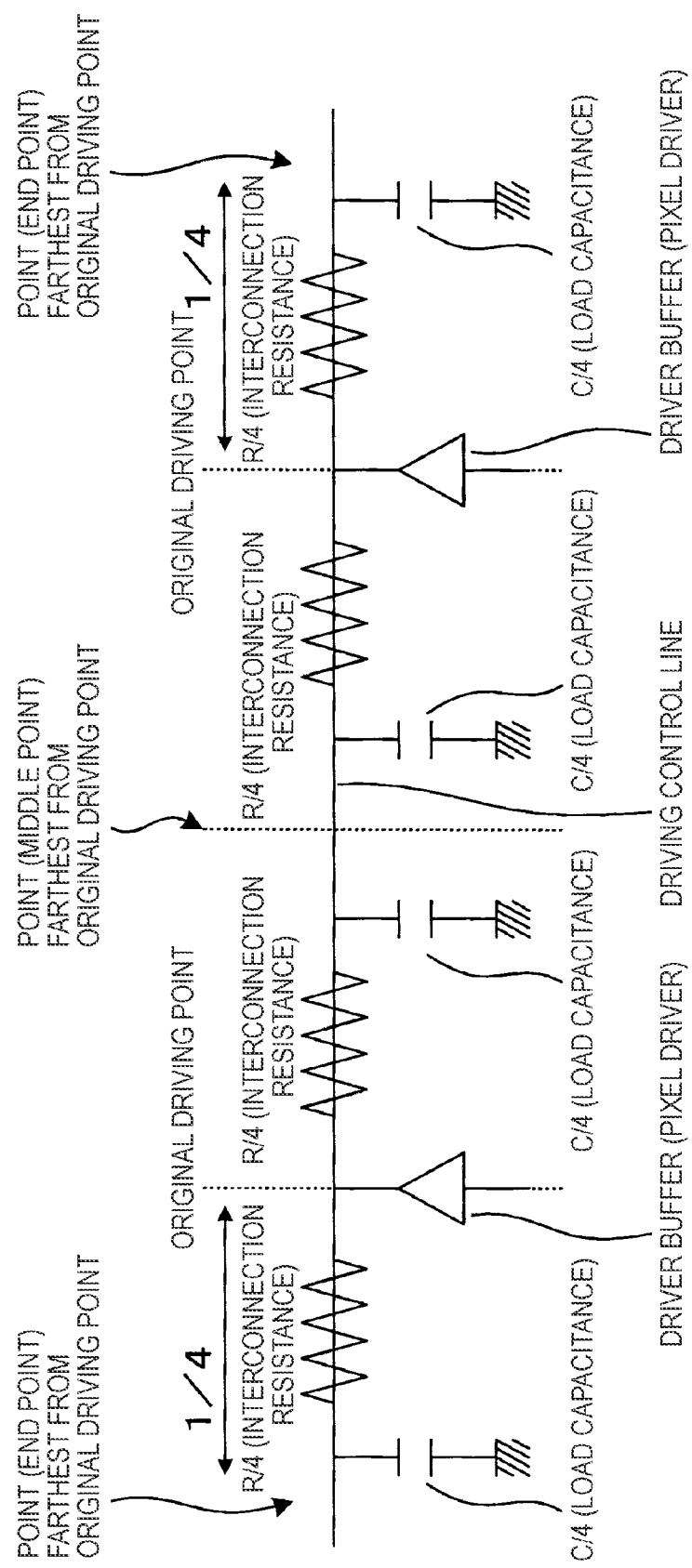
FIG. 3 is a diagram showing a skew reduction layout technique according to a first embodiment of the invention.

FIG. 3 shows a manner in which driving buffers are disposed so as to reduce skew (hereinafter, the technique will be referred to as a skew reduction layout technique) according to a first embodiment of the invention. FIG. 4 shows a comparative example in which driving is performed at one end, and FIG. 5 shows another comparative example in which driving is performed at both ends.

Figure 4A:
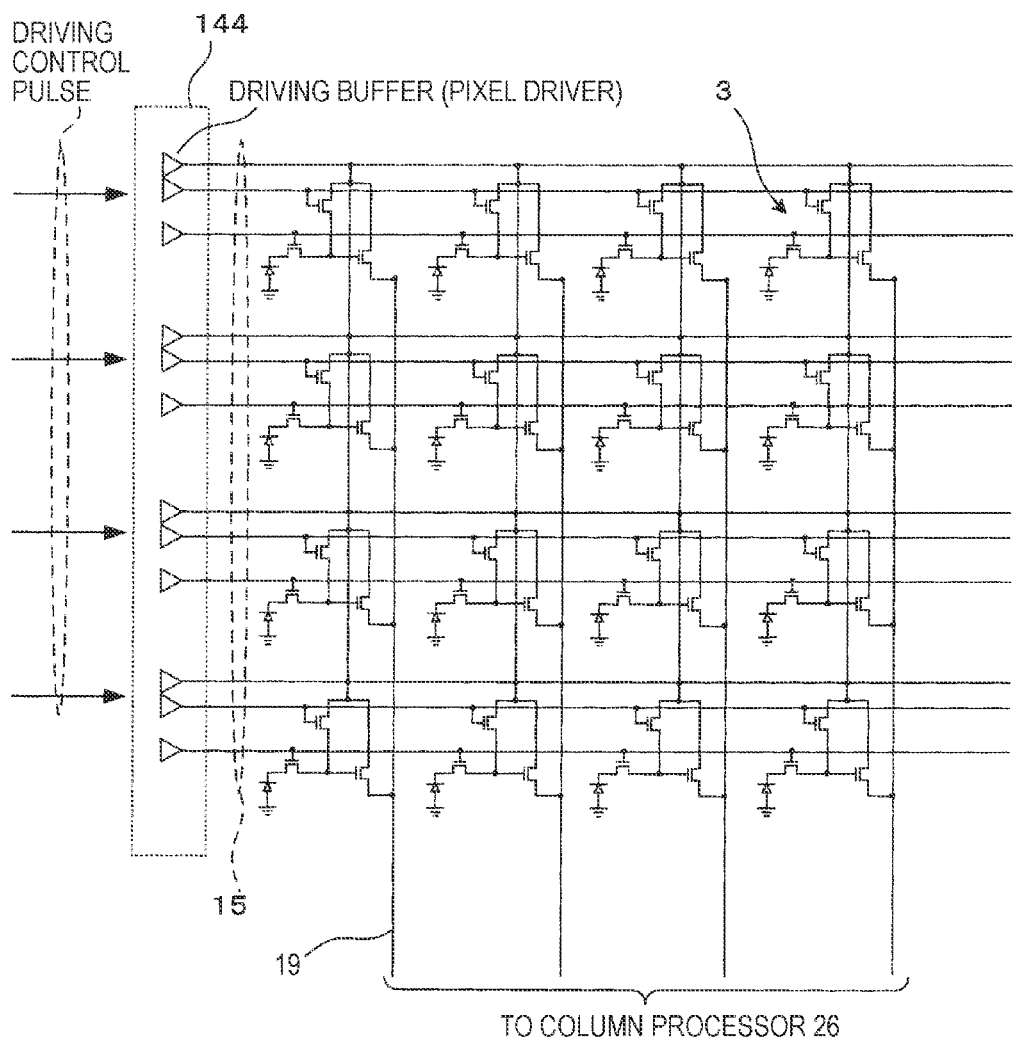
FIGS. 4A and 4B are diagrams showing a comparative example in which a control line is driven at only one end point thereof.
Figure 5A:
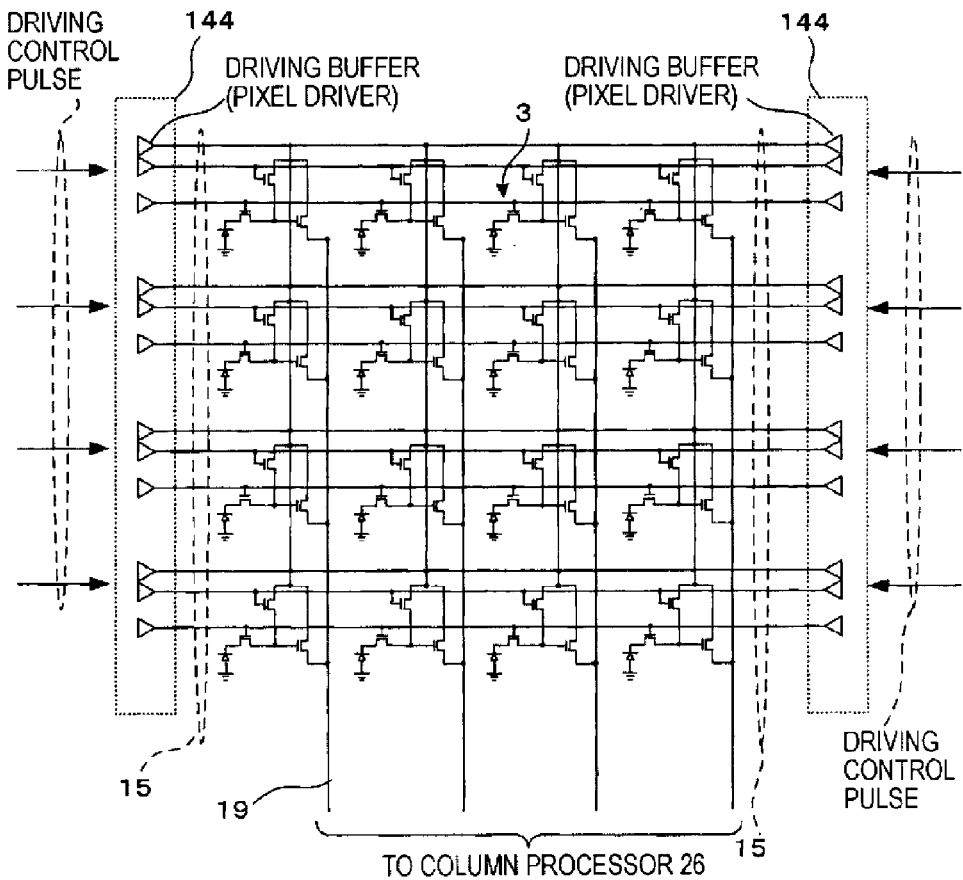
FIGS. 5A and 5B are diagrams showing a comparative example in which a control line is driven at both end points thereof.

When a vertical driving circuit 144 (that is, a driving buffer BF) is disposed at only one side of the pixel array part 10 as in the case of the configuration shown in FIG. 4(A), the load increases as the number of pixels is increased to achieve higher resolution. The increase in the load results in an increase in the difference in reading time between a pixel located close to the driving buffer and a pixel located far from the driving buffer. This can make it difficult to correctly read pixel signals, and can cause shading or noise.

Figure 4B:
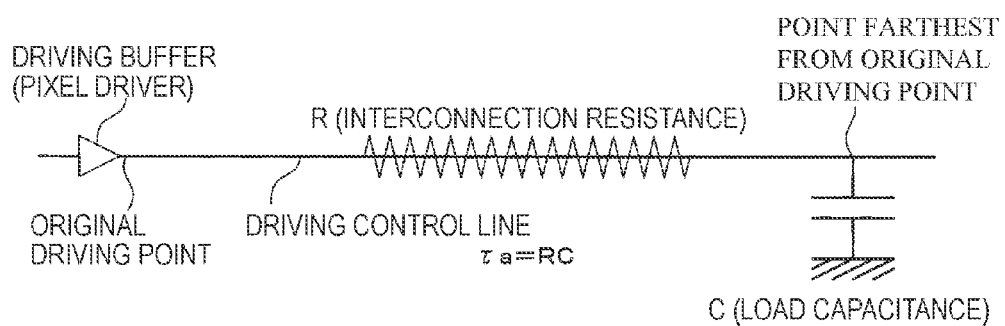

If the total line resistance is denoted by R and the total parasitic capacitance is denoted by C as shown in FIG. 4(B), the time constant τa for a point farthest from the driving point when driving is performed at one end is given by equation (1).

[Formula 1]

$$\tau a = RC \quad (1)$$

The "farthest point" refers to a point on a control line the distance from which to a original driving point at which a driving buffer is connected to the control line is greatest. When the line resistance and the load capacitance are uniformly distributed, the time constant (line resistance×load capacitance) becomes greatest at the farthest point, and the greatest value of the time constant is minimized by properly selecting the point at which the control line is driven.

One technique to ease the problem described above is, as shown in FIG. 5(A), to dispose vertical driving circuits 144 (driving buffers) on left and right sides of the pixel array part 10 and drive a control line connected to pixels from both sides of the pixel array part 10 thereby reducing the load imposed on each driving buffer.

Figure 5B:
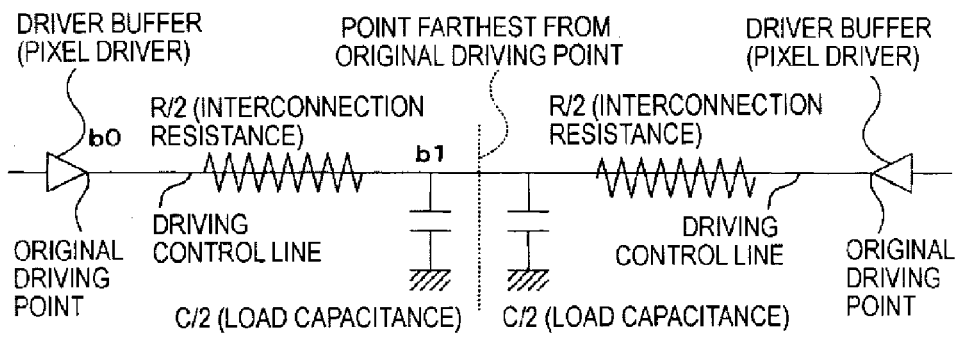

In this case, as shown in FIG. 5(B), if the total line resistance is denoted as R and the total parasitic capacitance is denoted as C, the line resistance and the parasitic capacitance at a point (at the center of the control line) farthest from both driving points (end points) are respectively given by R/2 and C/2, and thus the time constant τb at the point farthest from the driving points when the control line is driven at both ends is given by equation (2). Therefore, theoretically, the skew can be reduced to ¼ of that which occurs when the control line is driven at one end.

[Formula 2]

$$\tau b = R/2 \times C/2 = RC/4 \quad (2)$$

However, when the control line is driven at both ends, a pixel located at the center of the control line is driven with a greatest delay, although the delay is smaller than the delay that occurs when the control line is driven at one end. This is a serious problem to be solved when it is needed to read pixel signals at a higher speed.

In view of the above, in the first embodiment, as shown in FIG. 3, instead of driving the control line at both ends, the control line is driven at two dividing points on the control line whose distance from a closer end of the range in which skew is to be minimized is equal to ¼ of the total length of the range. Hereinafter, this driving method will be referred to as a two-dividing-point equal driving method.

In this driving method, if the total line resistance is denoted as R and the total parasitic capacitance is denoted as C, the line resistance and the parasitic capacitance at points farthest from the respective driving points (at both ends of the control line and at the center of the control line, in this specific example) are respectively given by R/4 and C/4, and thus the time constant τc at the points farthest from the driving points in the "two-dividing-point equal driving method" is given by equation (3). From equation (3), it can be seen that the time constant is ¼ of that in the both-end driving method and ¹⁄₁₆ of that in the one-end driving method.

[Formula 3]

$$\tau C = R/4 \times C/4 = RC/16 \quad (3)$$

That is, when original driving points are set at points whose distance from a closer end of a line is ¼ of the total length of the line, the theoretical skew is reduced to ¹⁄₁₆ of that in the one-end driving method shown in FIG. 4 and to ¼ of that in the both-end driving method shown in FIG. 5.

The driving buffers for driving the control line at dividing points do not necessarily need to be disposed within the vertical scanning circuit 14c. More preferably, they may be disposed in at least one of the vertical scanning circuits 14a and 14b, and the dividing points may be connected to the respective driving buffers via connection lines extending in parallel with the metal control line toward one or both ends of the control line.

This is because when a 2-dimensional sensor including a plurality of control lines extending in the row direction is driven, if driving buffers are disposed in the third vertical scanning circuit 14c located in the area adjacent to the upper side of the pixel array part 10, the distance from the driving buffers to the row varies depending on the row, and thus characteristics vary depending on the row. That is, new skew occurs. On the other hand, in the case in which driving buffers are disposed in the vertical scanning circuits 14a and 14b, and the driving points are connected to the respective driving buffers via connection lines extending in parallel with the control lines, all rows have equal characteristics.

Figure 11:
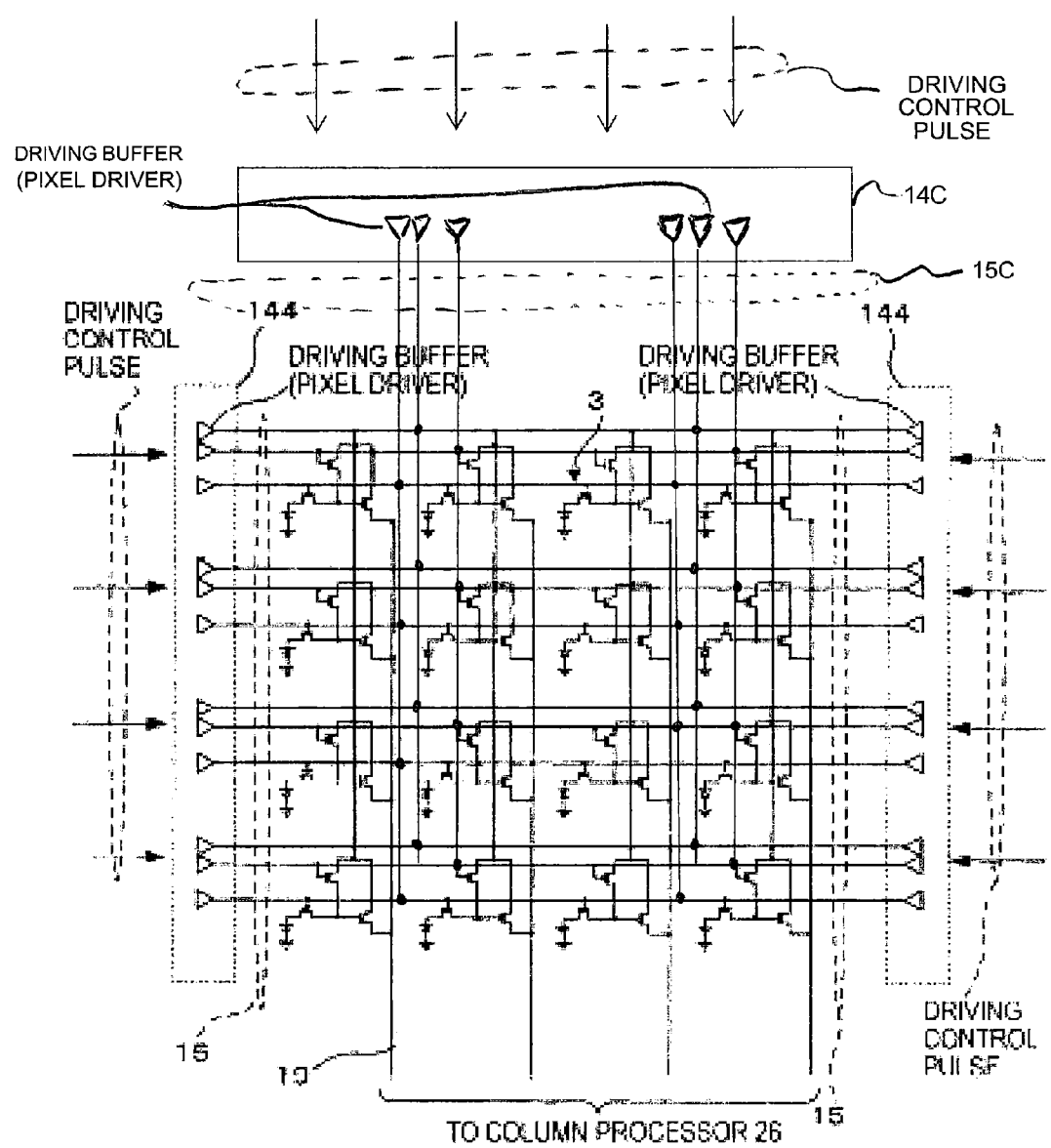
FIG. 11 is a diagram illustrating an example in which control lines are driven at both end points thereof and at arbitrary points therebetween.

In FIG. 11, there is illustrated an example of an additional driving circuit 14C which generates driving control pulses for driving the control lines at arbitrary dividing points located at other than the ends of the control lines. As illustrated, each control line is driven at an additional two locations as determined by the calculations discussed herein. When a control line is driven by driving control pulses 15 at both ends, it is also driven at the arbitrary dividing points by the driving control pulses 15. This is discussed in connection with the embodiment of FIG. 8.

As also illustrated, a signal path for a given driving control signal 15C can be coupled to multiple similar control lines, i.e. a similar control line in each row.

Of course, the control lines need not be driven at the ends thereof, as discussed in connection with FIGS. 3 and 7.

Figure 6:
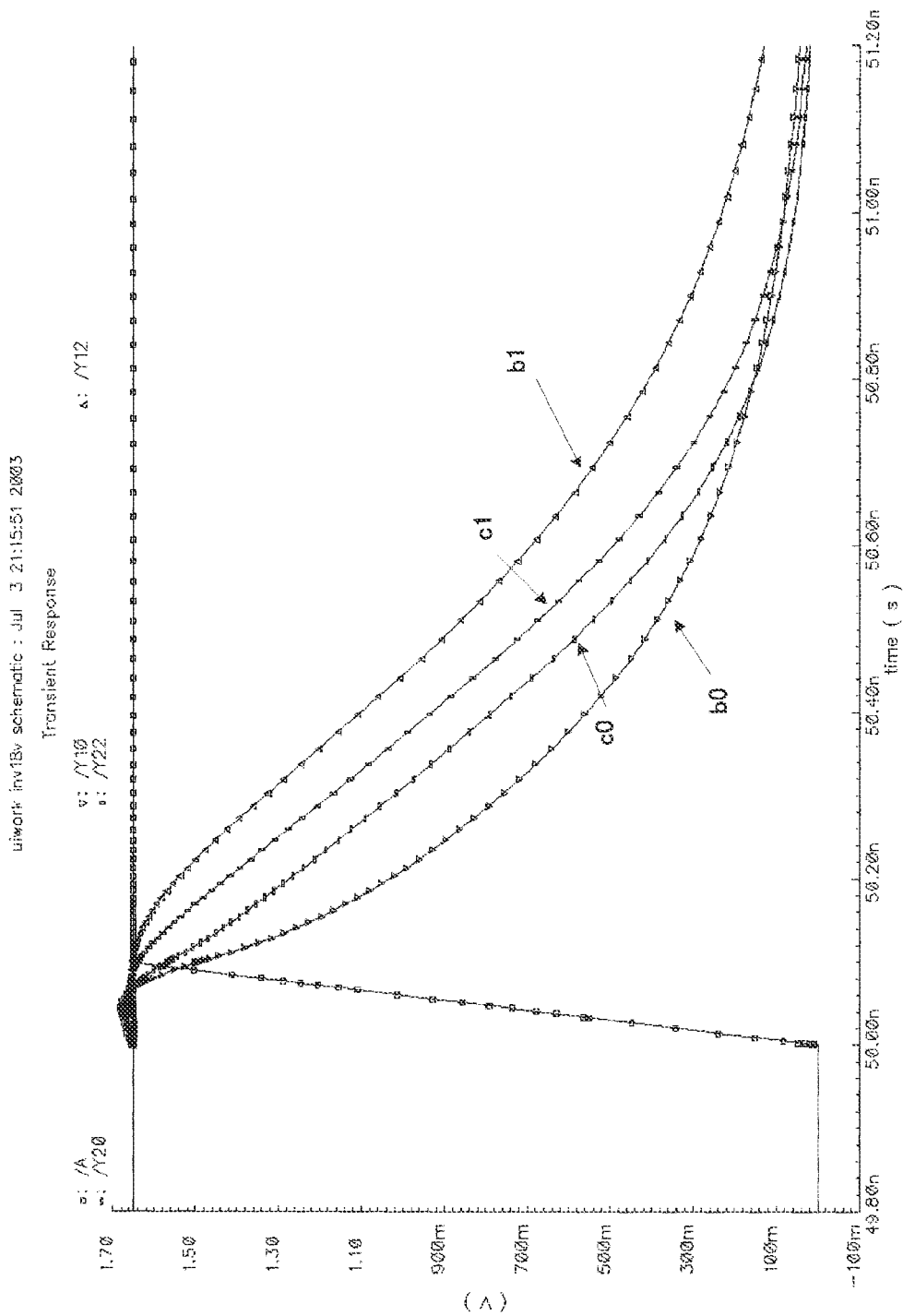
FIG. 6 is a graph showing simulated skew that occurs when driving points are set at both end points according to a conventional technique and simulated skew that occurs when a control line is driven using a two-dividing-point equal driving method.

FIG. 6 shows simulated skew at nodes b0 and b1 that occur when original driving points are set at both end points according to the conventional technique and simulated skew at nodes c0 and c1 that occur when original driving points are set at two dividing points.

In the simulation, parameters were set as follows.
1) Total line resistance: R=1.3 kΩ
2) Total parasitic line capacitance: C=1.5 pF
3) Driving buffer size: properly set to be capable of driving the line.

As can be seen from FIG. 6, the skew between nodes b0 and b1 is 250 ps, and the skew between nodes c0 and c1 is 70 ps which is ¼ of that between nodes b0 and b1 (when the skew is measured at 0.5 Vdd). This means that, theoretically, the skew can be reduced by employing the two-dividing-point equal driving method.

Second Embodiment

Figure 7:
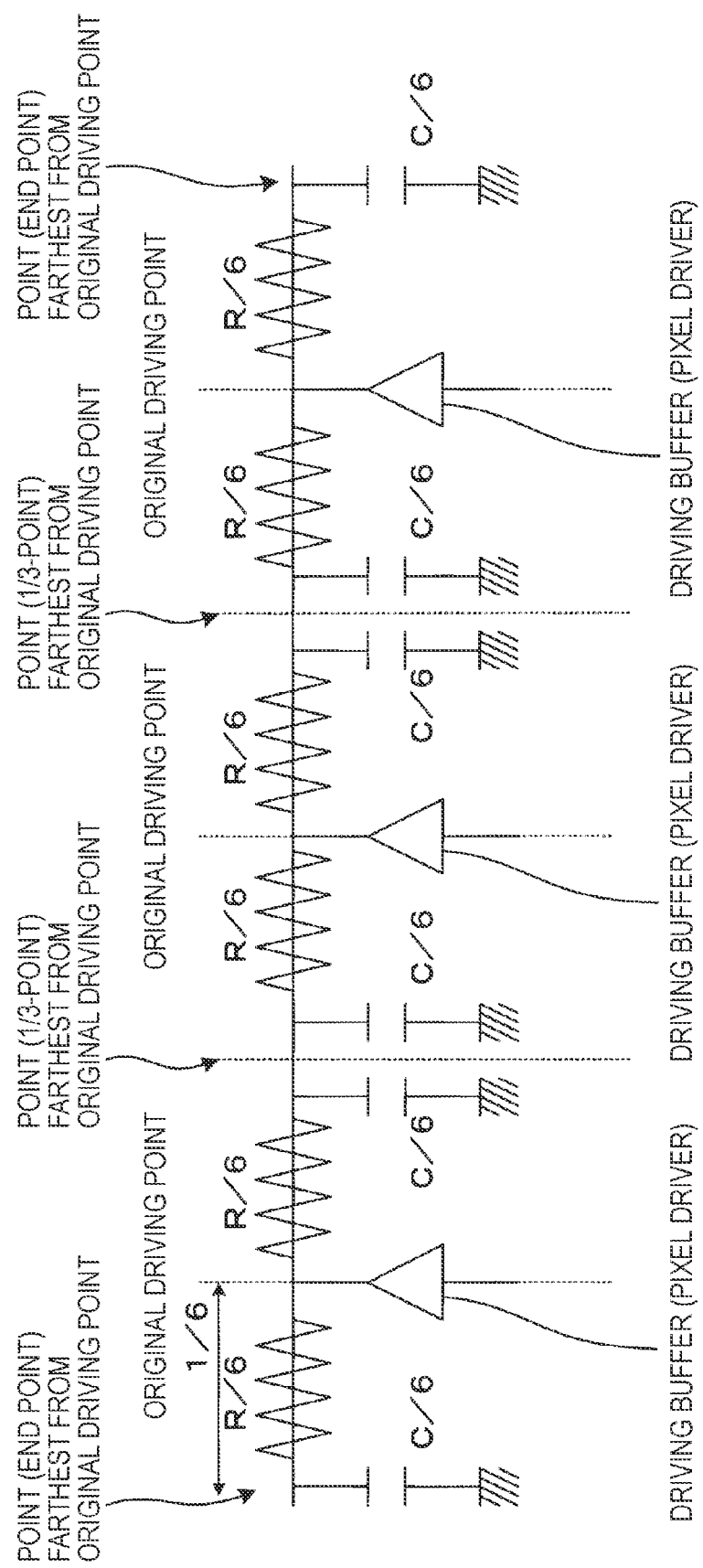
FIG. 7 is a diagram showing a skew reduction layout technique according to a second embodiment of the invention.

FIG. 7 shows a skew reduction layout technique according to a second embodiment of the invention. In this second embodiment, two ends of the control line are not used as original driving points, but original driving points are set at three dividing points of the control line such that points farthest from the respective driving points within the range in which skew is to be suppressed are distributed substantially equally. Hereinafter, this driving method will be referred to as the "three-dividing-point equal driving method".

To set three original driving points such that points farthest from the respective original driving points within the range in which skew is to be suppressed are equally distributed, the distance between each point farthest from the corresponding original driving point is set to be ⅙ of the total length of the control line as shown in FIG. 7.

In this case, if the total line resistance is denoted as R and the total parasitic line capacitance is denoted as C, the line resistance and the parasitic capacitance at the points farthest from the respective original driving points are respectively given by R/6 and C/6, and thus the time constant τd in the "three-dividing-point equal driving method" is given by equation (4). From equation (5), it can be seen that the time constant τd is ⅑ of that in the both-end driving method and ¹⁄₃₆ of that in the one-end driving method.

[Formula 4]

$$\tau d = R/6 \times C/6 = RC/36 \quad (4)$$

That is, when the "three-dividing-point equal driving method" is employed, the theoretical skew is reduced to ¹⁄₃₆ of that in the one-end driving method shown in FIG. 4 and to ⅑ of that in the both-end driving method shown in FIG. 5.

As described above, in the first and second embodiments, two ends of the control line are not used as original driving points, but a plurality of original driving points are set such that points farthest from the respective original driving points within the range in which skew is to be suppressed are equally distributed. As can be seen from these two embodiments, the skew can be more reduced as the number of dividing points increases.

When the control line is driven at only one dividing point, the skew becomes equal to that which occurs when the control line is driven at both ends thereof. However, even in this case, the dividing-point driving method has the advantage that skew similar to that which occurs when the control line is driven at both ends using two driving buffers can be obtained using only one driving buffer.

Third Embodiment

Figure 8:
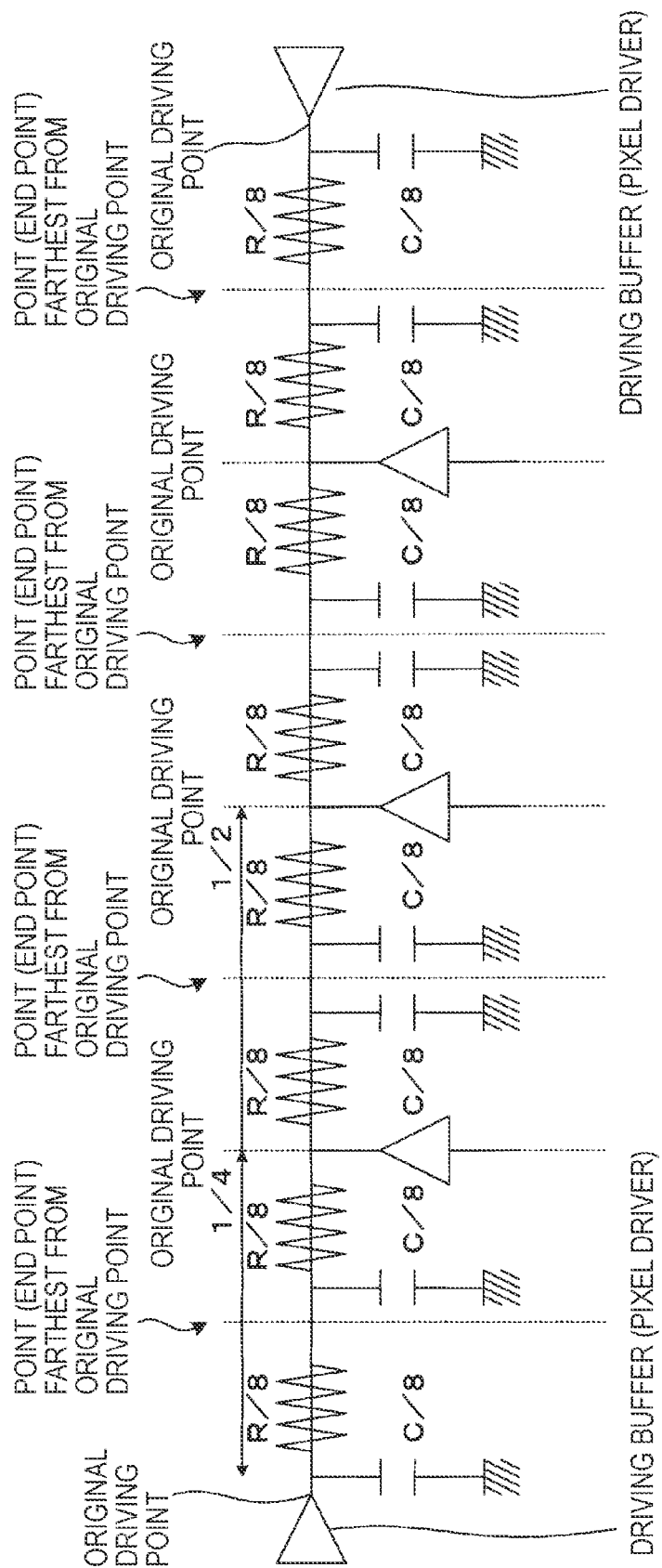
FIG. 8 is a diagram showing a skew reduction layout technique according to a third embodiment of the invention.

FIG. 8 shows a skew reduction layout technique according to a third embodiment of the invention. In this third embodiment, in addition to three original driving points on the control line two of which are located at points whose distance from a closer end of the control line is ¼ of the total length of the control line and the other one of which is located at the center of the control line, original driving points are set at two respective end points of the control line. Hereinafter, this driving method will be referred to as the "both-end and three-dividing-point equal driving method".

In this case, as shown in FIG. 8, if the total line resistance is denoted as R and the total parasitic capacitance is denoted as C, the line resistance and the parasitic capacitance at the points farthest from the respective original driving points are respectively given by R/8 and C/8, and thus the time constant τe in the "both-end and three-dividing-point equal driving method" is given by equation (5). From equation (5), it can be seen that the time constant τe is ¹⁄₁₆ of that in the both-end driving method and ¹⁄₆₄ of that in the one-end driving method.

[Formula 5]

$$\tau d = R/8 \times C/8 = RC/64 \quad (5)$$

That is, when the "both-end and three-dividing-point equal driving method" is employed, the theoretical skew is reduced to ¹⁄₆₄ of that in the one-end driving method shown in FIG. 4 and to ¹⁄₁₆ of that in the both-end driving method shown in FIG. 5. It can be seen from comparison with the "three-dividing-point equal driving method" according to the second embodiment that driving the control line not only at end points but also at dividing points can reduce the delay in a central range.

Although in this third embodiment, original driving points are set at three dividing points on the control line, two of which are located at points whose distance from a closer end of the control line is ¼ of the total length of the control line and the other one of which is located at the center of the control line in addition to two original driving points set at two respective end points of the control line, the number of dividing points on the control line used as original driving points is not limited to three, but original driving points may be set at an arbitrary number of dividing points.

Whether one or both ends are used as original driving points and/or how many dividing points are used as original driving points may be properly determined depending on the number of pixels, the required response speed, the load resistance, the load capacitance, etc. In addition to the main control line, one or more auxiliary control lines may be used to drive pixels in a range that should be driven with less skew.

When the line resistance and the load capacitance are uniformly distributed, it is desirable to set original driving points such that points farthest from the respective original driving points within the range in which skew is to be suppressed are equally (symmetrically) distributed.

However, original driving points may be set such that farthest points are unequally distributed. Even in this case, if the positions of the original driving points are selected such that a product of the line resistance and the line capacitance (the time constant) becomes equal for all farthest points, it is possible to achieve a similar reduction in skew to that achieved when the original driving points are set such that the farthest points are equally distributed (refer to a fourth embodiment described later).

For example, when a original driving point is set at one dividing point in addition to both end points, the position of the dividing point is set such that the distance the original driving point to a point farthest from the original driving point is ¼ of the total length of the control line. To this end, the location of the dividing point is set to be the center of the control line. That is, two control lines are prepared one of which is connected to all pixels in a line and the other one of which is connected to only pixels in a central range. The control line connected only to pixels in the central range has small load capacitance originating from the capacitance of the pixel transistors acting as loads, and thus driving pulses applied to this control line can rise more steeply than those applied to the control line connected to all pixels. The rising time can be as small as that of driving pulses output from driving buffers that drives a control line at both end points thereof.

Instead of using both end points and one or more dividing points as original driving points, only one end point and one or more dividing points may be used as original driving points. For example, when only one end point and one dividing point are used as original driving points, the location of the dividing point is set such that the distance between the dividing point and the end point that is not selected as the original driving point is equal to ⅓ of the total length of the control line.

Fourth Embodiment

Figure 9:
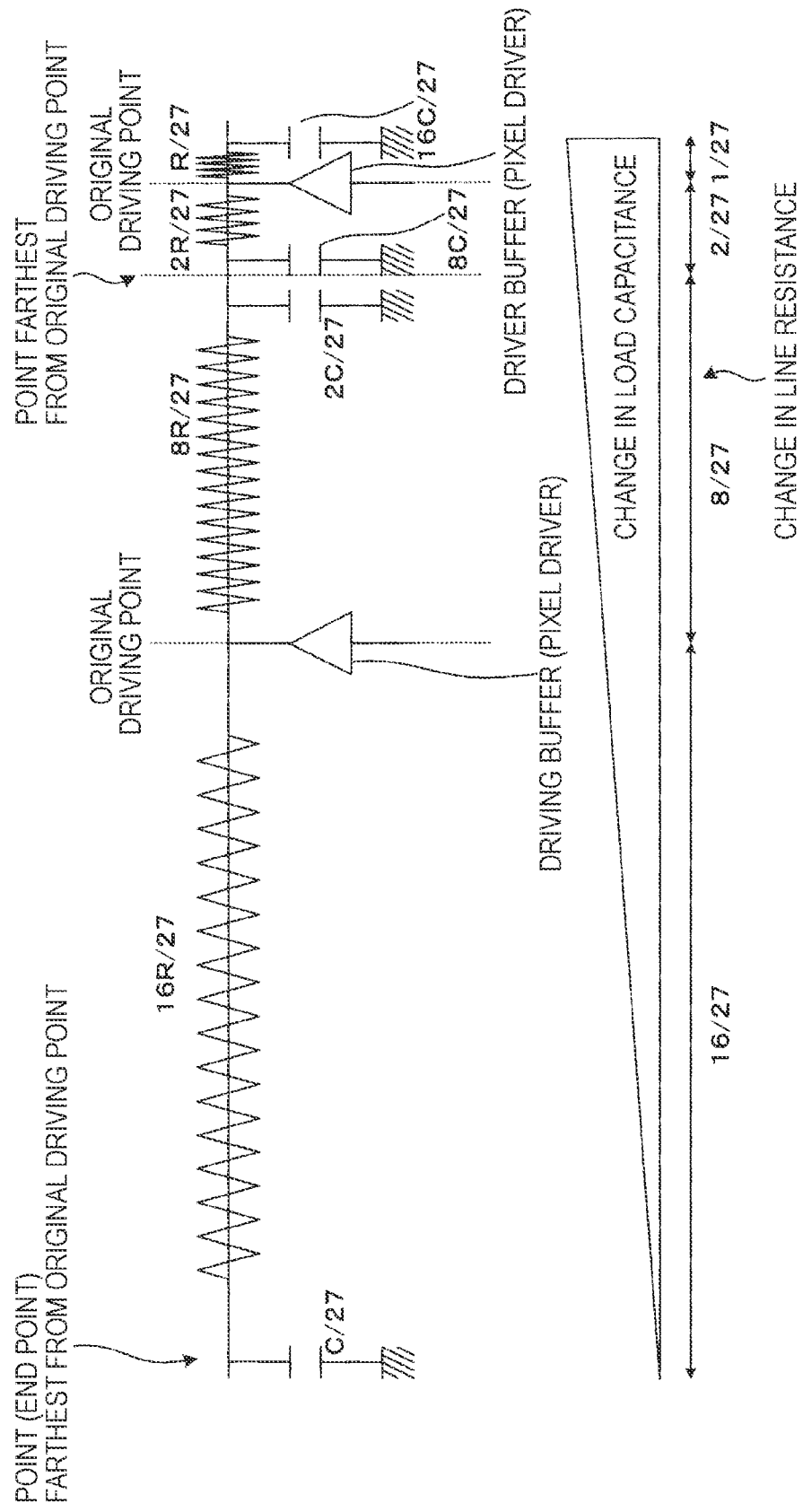
FIG. 9 is a diagram showing a skew reduction layout technique according to a fourth embodiment of the invention.
Figure 10:
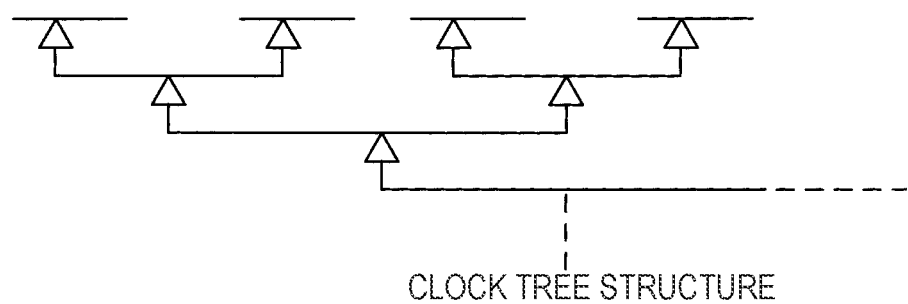
FIG. 10 is a diagram showing a tree-structure layout.

FIG. 9 shows a skew reduction layout technique according to a fourth embodiment of the invention. In this fourth embodiment, two ends of the control line are not used as original driving points, but original driving points are set at dividing points on the control line such that points farthest from original driving points are distributed at unequal intervals and such that a product of the line resistance and the line capacitance (the time constant) becomes equal for all farthest points. Hereinafter, this driving method will be referred to as an "unequal driving method".

When the line resistance and the line capacitance are distributed non-uniformly, if driving buffers are disposed at locations that cause the time constant τf given by a product of the line resistance and the line capacitance to be equal for all farthest points, it is possible to achieve a reduction in skew similar to that achieved according to one of the first to third embodiments.

For example, when original driving points are set at two unsymmetrical points, the time constant τf for any furthest point (at which the time constant becomes greatest) is given by equation (6). From equation (6), it can be seen that the time constant τf is ⅑ of that in the both-end driving method and ¹⁄₃₆ of that in the one-end driving method.

[Formula 6]

$$\tau f = 16RC/(27 \times 27) = 16RC/729 \quad (6)$$

Thus, if the "unequal driving method" according to the fourth embodiment of the invention is employed, the theoretical skew can be reduced to ¹⁶⁄₇₂₉ of that in the one-end driving method shown in FIG. 4 and to ⁴⁄₇₂₉ of that in the both-end driving method shown in FIG. 5.

As described above, in the present invention, a control line within a range in which skew is to be suppressed is driven at least at one or more arbitrary dividing points (driving at a plurality of dividing points is more desirable than driving at one dividing point) such that skew is reduced in the range in which skew is to be suppressed.

When line resistance and load capacitance of a control line are uniformly distributed, and when the number of driving buffers for driving the control line at dividing points is given, if the locations of the dividing points are set such that points farthest from the respective original driving points connected to the driving buffers are located at uniform intervals on the control line, this arrangement minimizes the maximum value of the product of the line resistance and the load capacitance between an arbitrary driving point on the control line and a driving buffer within the effective range in which the skew is to be suppressed.

When line resistance and load capacitance of a control line are non-uniformly distributed, and when the number of driving buffers for driving the control line at dividing points is given, if the locations of the dividing points are set such that the time constant becomes equal (and preferably greatest) at any point farthest from the respective original driving points connected to the driving buffers, it is possible to achieve a greatest improvement in skew.

In the present invention, because a control line is driven at a dividing point on the control line, skew can be reduced in a range in which skew should be suppressed, by using a small number of driving circuits.

If the location of the dividing point is determined such that the location results in a reduction in the maximum value of the time constant given by the product of load capacitance at an arbitrary driving point on the control line and line resistance between the arbitrary driving point and a driver unit that drives the original driving point, then it becomes possible to drive the control line at an optimum position even when the line resistance and the load capacitance are distributed non-uniformly.

Thus, the present invention makes it possible to ease a problem (skew) caused by non-uniformity of the driving capacity, which is very serious in particular when the number of pixels is increased or when pixels are driven at a high speed. Thus, it is possible to reduce shading and other problems.

CMOS image sensor is used as an example of a semiconductor device the present invention to which the present invention is applied. Also this invention is applied to a physical information acquisition apparatus like a camera module or a camera.

What is claimed is:

1. A physical information acquisition apparatus comprising:
 a semiconductor device including a plurality of pixel elements arranged in a particular order, each pixel element having a signal generation part for outputting at least one signal indicating a detected change in a physical quantity; and
 a drive control unit that drives a control line at a point located on the control line such that a maximum value of a product of (a) load capacitance at an arbitrary driving point on the control line and (b) line resistance between the arbitrary driving point and a driver unit that is connected to the point is substantially a local minimum, wherein the point is at a position along the driving control line between the ends of the control line and the control line is connected to at least one of the plurality of pixel elements.

2. A physical information acquisition apparatus according to claim 1, wherein the drive control unit is disposed in the semiconductor device.

3. The physical information acquisition apparatus according to claim 1, wherein the drive control unit causes a drive control pulse to be provided from the driver unit at a same timing as that of a drive control pulse supplied from one or both end points of the control line.

4. The physical information acquisition apparatus according to claim 1, wherein the drive control unit causes a drive control pulse to be provided from the driver unit at a same timing as that of a drive control pulse supplied from another point on the control line.

5. The physical information acquisition apparatus according to claim 1, wherein the drive control unit drives the control line at a point located on the control line such that a maximum value of a product of (a) load capacitance at an arbitrary driving point on the control line and (b) line resistance between the arbitrary driving point and the driver unit that is connected to the point is substantially a local minimum.

6. The physical information acquisition apparatus according to claim 1, wherein the drive control unit drives one or more other points located on the control line.

7. The physical information acquisition apparatus according to claim 6, wherein the point and the one or more other points are equally distributed on the control line.

8. The physical information acquisition apparatus according to claim 6, wherein the point and the one or more other points are unequally distributed on the control line.

9. The physical information acquisition apparatus according to claim 1, wherein the drive control unit drives another control line at a point located on the another control line.

10. The physical information acquisition apparatus according to claim 9, wherein the another control line is connected to all pixels in a line.

11. The physical information acquisition apparatus according to claim 1, wherein the drive control pulse is provided to the point at a same timing as that of a drive control pulse supplied provided from one or both end points of the control line.

12. The physical information acquisition apparatus according to claim 1, wherein the drive control pulse is provided to the point at a same timing as that of a drive control pulse supplied provided from another point on the control line.

* * * * *